UNITED STATES PATENT OFFICE.

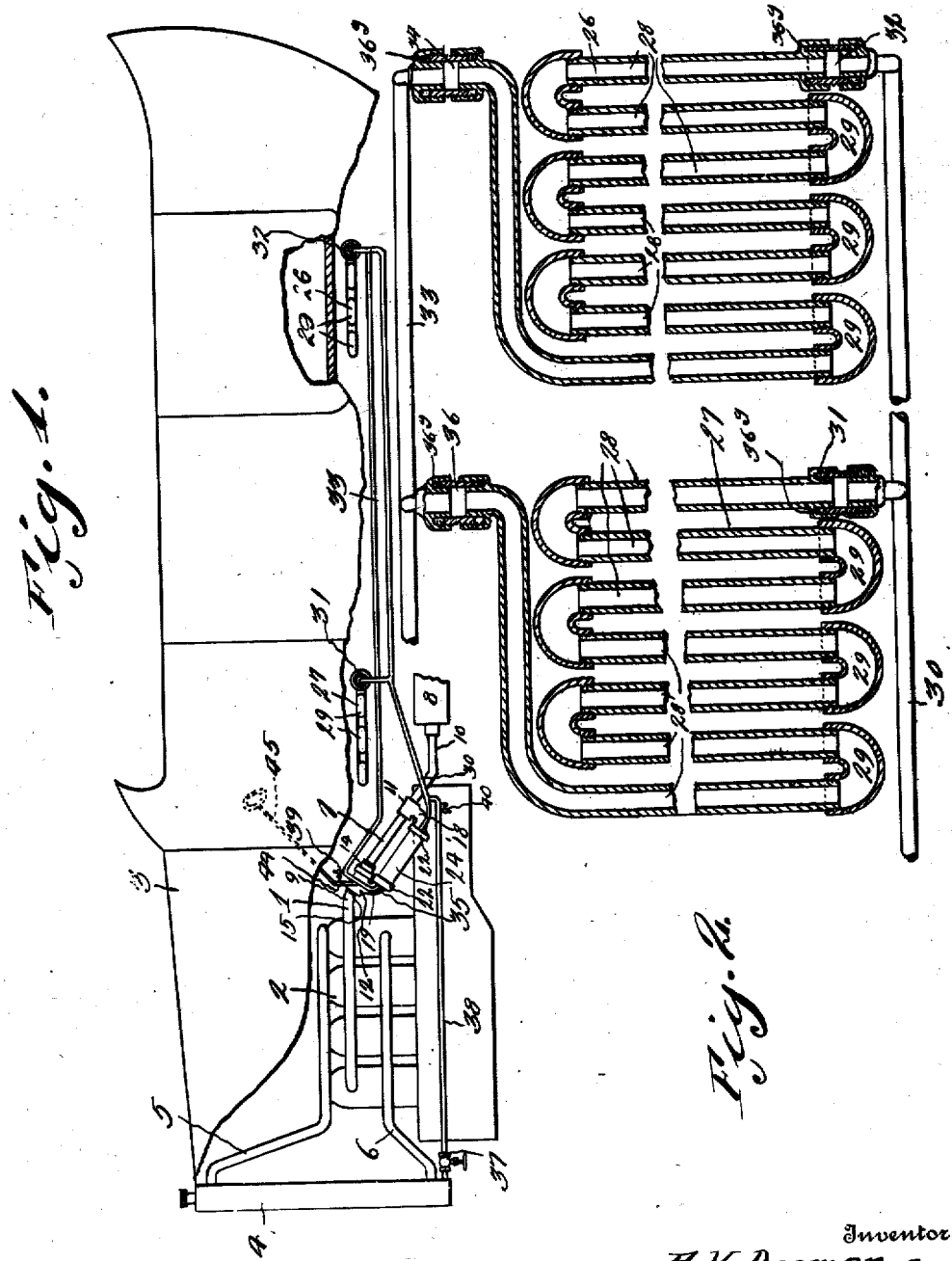

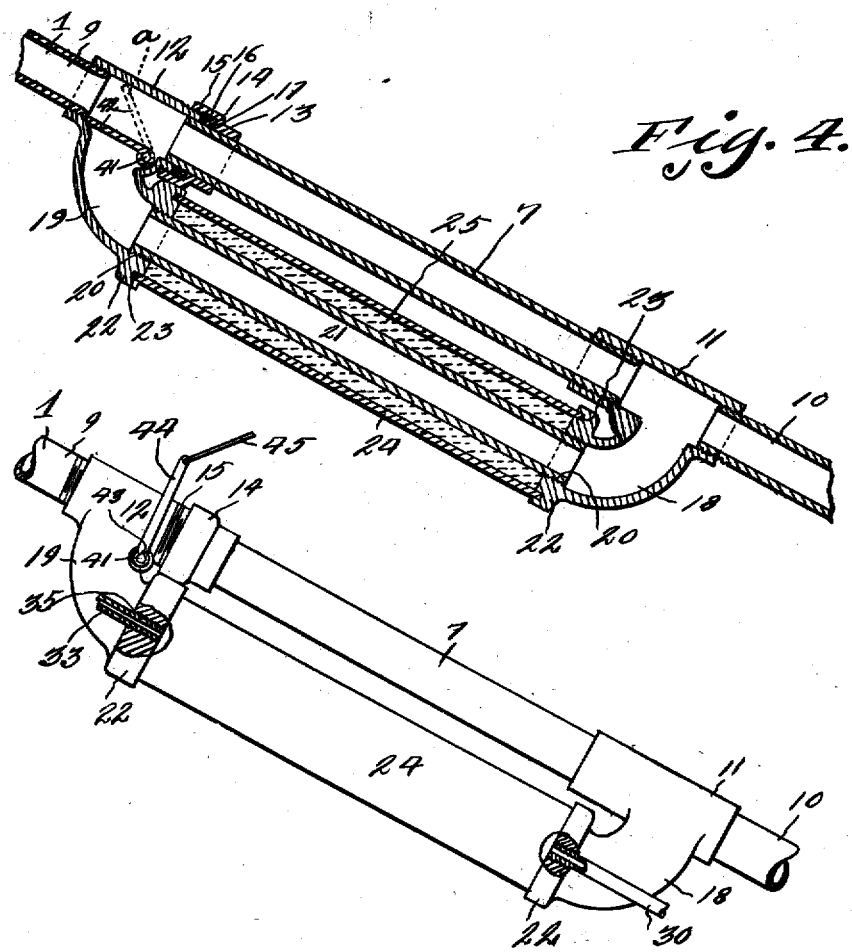

ALMON V. DEEMER AND CLARENCE KELLY, OF LEITERS FORD, INDIANA.

HEATER FOR AUTOMOBILES.

1,317,966.  Specification of Letters Patent.  Patented Oct. 7, 1919.

Application filed January 12, 1917. Serial No. 142,006.

*To all whom it may concern:*

Be it known that we, ALMON V. DEEMER and CLARENCE KELLY, citizens of the United States, residing at Leiters Ford, in the county of Fulton, State of Indiana, have invented a new and useful Heater for Automobiles; and we do hereby declare the following to be a full, clear, and exact description of the invention, such as will enable others skilled in the art to which it appertains to make and use the same.

This invention relates to an improved heater for automobiles, and an object of the invention is to provide a heater to be carried by the exhaust manifold of an automobile engine and having connections with the radiators under the floor of the automobile and provided with connections with the usual automobile radiator, whereby the radiators may be supplied with water from the radiator of the automobile.

A further object of the invention is to provide a by-pass pipe on the exhaust manifold through which the exhaust from the engine may pass, in order to heat water in a water space of said by-pass pipe, which heated water may be conveyed to a series of radiators under the floor of the automobile.

A further object of the invention is the provision of means for turning the exhaust into and from the by-pass pipe, which means may be controlled by the operator of the automobile.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in side elevation of an automobile, partly broken away, showing the heating system applied thereto in elevation.

Fig. 2 is a sectional view through the radiator under the floor of the automobile.

Fig. 3 is an enlarged view in side elevation of the water heater in the form of a by-pass pipe carried by the exhaust manifold.

Fig. 4 is a view in section of the structure shown in Fig. 3.

Referring more especially to the drawings, 1 designates the usual exhaust manifold of the engine 2 of the automobile 3, and 4 denotes the conventional form of automobile radiator, which is provided with the usual conduit connections 5 and 6 with the water jacket of said engine. The exhaust manifold 1 is provided with an inclined portion 7, and beyond this portion, said manifold connects to the usual form of muffler 8. The inclined portion 7 of the exhaust manifold is axially connected to the other portions 9 and 10 of said manifold by means of the fittings 11 and 12. The fitting 12 is connected to the inclined portion 7 by means of an expansible joint 13. This joint consists of a fitting 14 surrounding the upper forward end of the inclined part 7 and threaded at 15 to the fitting 12, there being a suitable packing 16 between the shoulder 17 and one end of the said fitting 12. It is to be noted that the inclined portion or part 7 of the manifold extends partially into the fitting 12. Both fittings 11 and 12 merge integrally into the elbows 18 and 19, the extremities of which are axially disposed, one toward the other, and are threaded at 20 to the opposite ends of the tube 21. The axially alined extremities of said elbows 18 and 19 have enlargements 22, the adjacent faces of which are provided with annular channels 23 for the reception of the opposite ends of the tube 24, which surrounds the tube 21, and is of sufficient diameter to provide considerable space between the inner surface of the tube 24 and the exterior surface of the tube 21, for the reception of water from the usual automobile radiator. Arranged under the floor of the automobile are two radiators 26 and 27, each consisting of an undulated conduit comprising the sections 28 arranged in parallelism and having their opposite ends connected in staggered relations by the semicircular fittings 29. A pipe 30 connects to the enlargement 22 of the elbow 18 and is in communication with the water chamber 25 between the walls of the tubes 21 and 24, and which pipe 30 is in turn connected to the radiators 26 and 27, respectively, as shown at 31 and 32, whereby the heated water from the water chamber 25 may be carried to said radiators 26 and 27. A suitable pipe 33 is provided, one end of which is connected at 34 to the radiator 26, and its other end is in communication with the water chamber 25, by passing through the enlargement 22 of the elbow 19, as shown at 35. However, the pipe 33 is in communication with the radiator 27 by means of the short connection 36. The joints 31, 32, 34 and 36 are provided with suitable packings 36ª, to prevent leakage. It is to be noted that the joint 32 is axially alined with the joint 34, and the joint 31 axially alined with the joint 36. By this arrangement, the radiators 26 and 27 may be raised or tilted from horizontal positions to vertical positions, without loosening any of the connections. Said radiators 26 and 27 may be tilted vertically downwardly when not used, or may be turned vertically downwardly, rearwardly and then upwardly so as to be directed under the seats of the automobile, and while in such positions, the water from the system will easily and readily pass out when it is desired that the system be drained. Extending from the automobile radiator, and in communication therewith, and provided with a valve 37, is a pipe 38, which connects to and is in communication with the pipe 30, whereby, upon opening the valve 37, water from the radiator 4 may be allowed to circulate into the heating system of the automobile. The pipe 33, just before it connects to the enlargement 22 of the elbow 19, is provided with a pet-cock 39, to remove the air as the heating system is filled with the water from the radiator 4. A suitable pet-cock 40 is provided on the pipe 38 to drain the system. Extending transversely of where the elbow 19 merges integrally with the fitting 12, is a rod 41, movable with which is a pivotal or hinge flap valve 42. Keyed at 43 on one end of the rod 41, is an arm 44, to which a suitable rod 45 is connected, whereby an operator, upon manipulating the rod 45, may rock the rod 41, and move the flap valve 42 to the dotted line position a in Fig. 4, in which case, the exhaust from the engine will be by-passed through the tube 21, and then pass out through the portion 10 of said manifold, thereby throroughly heating the water in the chamber 25, and owing to the water circulating through the radiators 26 and 27, heat will radiate therefrom and heat the automobile. However, when the flap valve 65 is closed, as shown in full lines in Fig. 4, the greater portion of the exhaust will take its usual course through the inclined portion 7 of said manifold. It is to be noted that the heater carried upon the manifold may be disposed vertically or upon an inclination, in order that the inlet of the exhaust into the tube 21 will be higher than the outlet from the tube 21.

It is to be noted that the heating system for the automobile may be filled with water from the automobile radiator 4, and when said system is filled, the valve 37 may be closed, and in this case the heating system may operate independent of the circulating water system of the radiator 4 and the engine, and viceversa. Furthermore, when it is desired to drain the heating system, the valve 37 may remain closed, and the valve cock 40 open, it being at the lowest point of the system, in which case the entire system may be drained. The circulation of the steam to the radiators 26 and 27 may be regulated by opening the pet cock 39, which will allow part of the steam to pass off, consequently cooling off the system.

The invention having been set forth, what is claimed as new and useful, is:—

1. In a heat exchange device for automobile heaters, a pair of elbows spaced apart, each having a T end connected to the exhaust manifold of the automobile, the other end of each elbow being internally threaded and having a flange provided with an annular recess, an inclined heater comprising an inner tube engaging the interior threads of the elbows, thereby providing a by-pass passage, the opposite ends of which are in communication with the exhaust manifold through said elbows, and an outer tube entirely surrounding and spaced from the inner tube and having its ends engaging said annular recesses of the flanges of said elbows, means pivoted in the T-end of the upper most elbow and adapted to be operated, whereby the exhaust may be deflected through the bypass passage of said heater, the upper and lower ends of the space between the inner and outer tubes of said heater having means adapted for connections with heating units.

2. In a heat exchange device for automobile heaters, a heater carried by an inclined portion of the exhaust manifold of the automobile, said heater comprising an inner tube having its opposite ends in communication with said exhaust manifold at spaced distances, thereby forming a bypass passage for the exhaust, an outer tube entirely surrounding and spaced from the inner tube, whereby a water containing space is provided, a hinged flap valve in the upper end of the heater, whereby the exhaust may be diverted from its usual course through the inner tube of the heater, the upper and lower ends of said water space having means adapted for communication with heating units.

In testimony whereof we have signed our names to this specification in the presence of two subscribing witnesses.

ALMON V. DEEMER.
CLARENCE KELLY.

Witnesses:
B. F. OVERMYER,
C. E. HIATT.